(12) United States Patent
Volkman et al.

(10) Patent No.: US 9,900,648 B2
(45) Date of Patent: Feb. 20, 2018

(54) SYSTEMS AND METHODS FOR SEARCH AND CATEGORIZATION

(71) Applicant: Echostar Technologies L.L.C., Englewood, CO (US)

(72) Inventors: William Volkman, Broomfield, CO (US); Mi Chen, Aurora, CO (US); Danny J. Minnick, Castle Rock, CO (US); Jean McAuliffe, Boulder, CO (US)

(73) Assignee: Echostar Technologies L.L.C., Englewood, CO (US)

(*) Notice: Subject to any disclaimer, the term of this patent is extended or adjusted under 35 U.S.C. 154(b) by 0 days.

(21) Appl. No.: 15/243,639

(22) Filed: Aug. 22, 2016

(65) Prior Publication Data
US 2017/0055040 A1 Feb. 23, 2017

Related U.S. Application Data

(60) Provisional application No. 62/208,446, filed on Aug. 21, 2015.

(51) Int. Cl.
*H04N 21/431* (2011.01)
*H04N 21/432* (2011.01)
(Continued)

(52) U.S. Cl.
CPC .......... *H04N 21/431* (2013.01); *G06F 3/048* (2013.01); *H04N 5/445* (2013.01); *H04N 21/251* (2013.01);
(Continued)

(58) Field of Classification Search
None
See application file for complete search history.

(56) References Cited

U.S. PATENT DOCUMENTS 7,096,483 B2* 8/2006 Johnson ............ H04N 5/44543
348/E5.105
7,213,256 B1* 5/2007 Kikinis ............ H04N 5/44543
348/E5.105

(Continued)

FOREIGN PATENT DOCUMENTS

WO 2001-080070 10/2001

OTHER PUBLICATIONS

Rovira, et al., "IndexTV: A MPEG-7 Based Personalized Recommendation System for Digital TV," *Multimedia and Expo, 2004. ICME '04. 2004 IEEE International Conference on* vol. 2. IEEE, 2004, 4 pages.

*Primary Examiner* — Ricky Chin
(74) *Attorney, Agent, or Firm* — Kilpatrick Townsend & Stockton LLP

(57) ABSTRACT

Aspects of the present disclosure include techniques for dynamically generating a results list based on real-time data gathered from a television receiver, user interaction, and other resources. The systems and methods may include receiving, via the one␣␣␣␣␣␣ or more tuners, from the television service provider distribution network, a set of television data, wherein the television data is associated with programming of multiple television channels, receiving a set of user data, wherein the user data includes data associated with a user of the television receiver, receiving an input from the user, wherein the input indicates a preference for a search, determining a list of input results based on the set of television data, the set of user data, and the input, and transmitting the list of television input results, wherein when the list of television input results is received, the list of television input results is displayable on the display device.

12 Claims, 10 Drawing Sheets

(51) Int. Cl.

| | | |
|---|---|---|
| *H04N 21/433* | (2011.01) | |
| *H04N 21/442* | (2011.01) | |
| *H04N 5/445* | (2011.01) | |
| *G06F 3/048* | (2013.01) | |
| *H04N 21/482* | (2011.01) | |
| *H04N 21/25* | (2011.01) | |
| *H04N 21/258* | (2011.01) | |
| *H04N 21/2668* | (2011.01) | |
| *H04N 21/45* | (2011.01) | |
| *H04N 21/658* | (2011.01) | |

(52) U.S. Cl.
CPC ... *H04N 21/25891* (2013.01); *H04N 21/2668* (2013.01); *H04N 21/432* (2013.01); *H04N 21/4312* (2013.01); *H04N 21/4314* (2013.01); *H04N 21/4316* (2013.01); *H04N 21/4332* (2013.01); *H04N 21/44222* (2013.01); *H04N 21/4532* (2013.01); *H04N 21/4826* (2013.01); *H04N 21/4828* (2013.01); *H04N 21/6582* (2013.01)

(56) References Cited

U.S. PATENT DOCUMENTS

| | | | | |
|---|---|---|---|---|
| 7,373,652 B1* | 5/2008 | Bayrakeri | ........... | H04N 5/44543 707/999.003 |
| 7,506,350 B2* | 3/2009 | Johnson | ............ | H04N 5/44543 707/999.003 |
| 7,657,151 B2* | 2/2010 | Goodwin | ............. | G11B 19/025 386/292 |
| 7,836,466 B2* | 11/2010 | Marsh | ............... | G06F 17/30038 725/37 |
| 8,365,221 B2* | 1/2013 | Schlarb | ............... | H04N 5/44543 725/40 |
| 8,438,160 B2 | 5/2013 | Aravamudan et al. | | |
| 8,943,537 B2 | 1/2015 | Hannum et al. | | |
| 9,179,195 B2* | 11/2015 | Rao | ................... | H04N 5/44543 |
| 9,338,493 B2 | 5/2016 | Van Os et al. | | |
| 2001/0029610 A1* | 10/2001 | Corvin | ..................... | H04N 5/76 725/42 |
| 2003/0028871 A1* | 2/2003 | Wang | ................ | H04H 60/65 725/9 |
| 2005/0278741 A1* | 12/2005 | Robarts | .............. | H04N 5/44543 725/46 |
| 2008/0282291 A1* | 11/2008 | Henty | ................ | H04N 21/4622 725/44 |
| 2010/0235351 A1* | 9/2010 | Iwasa | ................ | G06F 17/30038 707/723 |
| 2011/0296463 A1* | 12/2011 | Suslov | ................ | G06F 17/3053 725/44 |
| 2012/0311640 A1* | 12/2012 | Cahnbley | ............. | H04H 60/65 725/53 |
| 2013/0235027 A1* | 9/2013 | Sharifi | ............... | G06Q 10/0637 345/418 |
| 2014/0373063 A1* | 12/2014 | Funk | ................. | H04N 21/4826 725/45 |
| 2015/0370920 A1* | 12/2015 | Van Os | ............. | G06F 17/30973 707/767 |
| 2016/0219340 A1* | 7/2016 | Perez | ............... | H04N 21/47202 |
| 2016/0345070 A1* | 11/2016 | Beeson | ............... | H04N 21/4828 |

* cited by examiner

900 

RECEIVE, VIA ONE OR MORE TUNERS, FROM THE TELEVISION SERVICE PROVIDER DISTRIBUTION NETWORK, A SET OF TELEVISION DATA, WHEREIN THE TELEVISION DATA IS ASSOCIATED WITH PROGRAMMING OF MULTIPLE TELEVISION CHANNELS

902

RECEIVE A SET OF USER DATA, WHEREIN THE USER DATA INCLUDES DATA ASSOCIATED WITH A USER OF THE TELEVISION RECEIVER

904

RECEIVE AN INPUT FROM THE USER, WHEREIN THE INPUT INDICATES A PREFERENCE FOR A SEARCH

906

DETERMINE A LIST OF INPUT RESULTS BASED ON THE SET OF TELEVISION DATA, THE SET OF USER DATA, AND THE INPUT

908

TRANSMIT THE LIST OF TELEVISION INPUT RESULTS, WHEREIN WHEN THE LIST OF TELEVISION INPUT RESULTS IS RECEIVED, THE LIST OF TELEVISION INPUT RESULTS IS DISPLAYABLE ON THE DISPLAY DEVICE

SYSTEMS AND METHODS FOR SEARCH AND CATEGORIZATION

CROSS REFERENCE TO RELATED APPLICATION(S)

This application claims priority to U.S. Provisional Application No. 62/208,446, filed Aug. 21, 2015, the disclosure of which is incorporated by reference herein in its entirety.

FIELD OF THE TECHNOLOGY

The present disclosure relates to a computer technology for generating and transmitting results lists during a search of a television receiver for data using a television search device. Specifically, various techniques and systems are provided for dynamically generating a results list based on real-time data gathered from a television receiver, user interaction, and other resources.

BRIEF SUMMARY

The present disclosure relates to a computer technology for generating and transmitting results lists during a search of a television receiver for data using a television search device. Specifically, various techniques and systems are provided for dynamically generating a results list based on real-time data gathered from a television receiver, user interaction, and other resources. In an embodiment, a television receiver for generating input results is disclosed. The television receiver comprises one or more tuners configured to receive television programming via a television service provider distribution network, a television interface configured to output the television programming to a display device, one or more processors, and a memory communicatively coupled with and readable by the one or more processors and having stored therein processor-readable instructions. The instructions, when executed by the one or more processors, cause the one or more processors to receive, via the one or more tuners, from the television service provider distribution network, a set of television data, wherein the television data is associated with programming of multiple television channels, receive a set of user data, wherein the user data includes data associated with a user of the television receiver, receive an input from the user, wherein the input indicates a preference for a search, determine a list of input results based on the set of television data, the set of user data, and the input, and transmit the list of television input results, wherein when the list of television input results is received, the list of television input results is displayable on the display device.

In another embodiment, a computer-implemented method, comprises receiving, via the one or more tuners, from the television service provider distribution network, a set of television data, wherein the television data is associated with programming of multiple television channels, receiving a set of user data, wherein the user data includes data associated with a user of the television receiver, receiving an input from the user, wherein the input indicates a preference for a search, determining a list of input results based on the set of television data, the set of user data, and the input, and transmitting the list of television input results, wherein when the list of television input results is received, the list of television input results is displayable on the display device.

In another embodiment, a computer-program product tangibly embodied in a non-transitory machine-readable storage medium. The non-transitory machine-readable storage medium may include instructions configured to cause a data processing apparatus to receive, via the one or more tuners, from the television service provider distribution network, a set of television data, wherein the television data is associated with programming of multiple television channels, receive a set of user data, wherein the user data includes data associated with a user of the television receiver, receive an input from the user, wherein the input indicates a preference for a search, determine a list of input results based on the set of television data, the set of user data, and the input, and transmit the list of television input results, wherein when the list of television input results is received, the list of television input results is displayable on the display device.

In an aspect, of any of the above embodiments, the set of television data includes predetermined television programming information related to the multiple television channels. In another aspect, the set of television data includes data related to an environment of the television receiver. In another aspect, the set of user data includes data related to preferences of a user of the television receiver. In another aspect, the preferences of the user are collected over a period of time and are based on the user's interactions with the television receiver. In another aspect, the list of input results includes a ranking of results, wherein the ranking of the results is determined based on the set of television data, the set of user data, and the input. In another aspect, the list of input results includes one or more results groupings, wherein the results groupings each include a set of results associated with the grouping.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 9 illustrates an embodiment of a method for dynamically generating a results list based on user, the user's input, and collected television receiver data, according to some embodiments.

DETAILED DESCRIPTION

Figure 1:
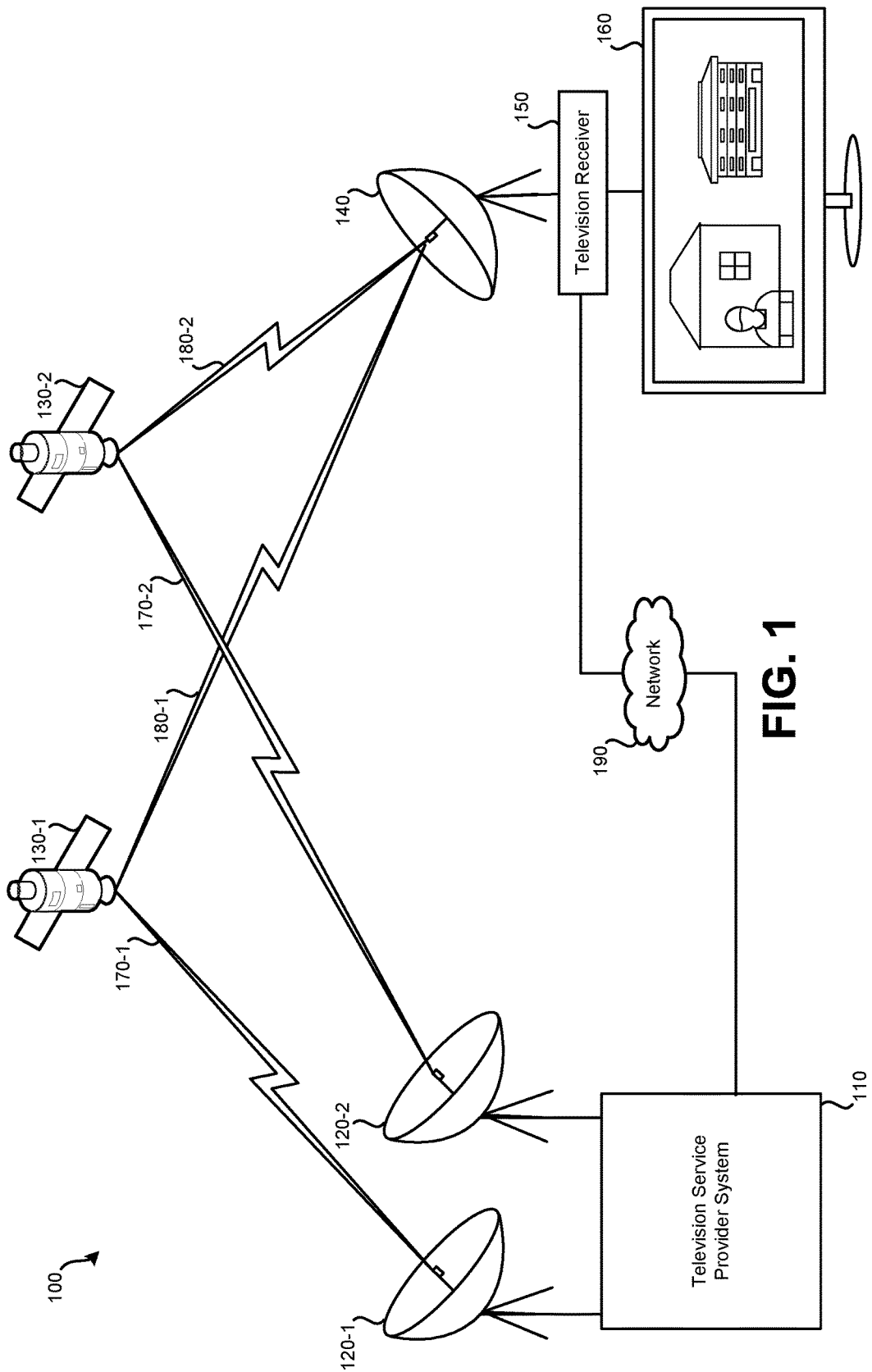
FIG. 1 illustrates an embodiment of a satellite television distribution system.

The present disclosure is directed to systems, methods, and products for receiving, gathering, categorizing, and displaying data on a graphical user interface, such as a receiver interface of a television receiver. Furthermore, the present disclosure is also directed to systems, methods, and products for interacting with and/or controlling such a graphical user interface to search for and find certain subsets of the data so that the subsets of the data are displayed on the graphical user interface. The disclosed systems, methods, and products enable more efficient navigation of the data on the graphical user interface, such as by interpreting input commands in a more efficient manner, requiring fewer numbers of input steps to achieve a particular result, and/or using reduced processor or system resources, as compared to previous techniques. In this way, a user experience can be enhanced by increasing the usability and reducing the input time required for performing a many step sequence, resulting in a more intuitive input experience for a user.

For example, the disclosed systems, methods, and products may include receiving input data from an input device and processing the input data more efficiently. The input devices are useful for providing input data, such as a string of letters or words, that can be interpreted as providing a selection of one or more subsets of the data. As will be understood by the skilled artisan, buttons or arrays of buttons may be present on a keyboard, remote control, or other similar input device and are typically intended for providing input data via individual buttons presses.

As used herein, a graphical user interface refers to an interactive display in which commands can be entered and received using one or more input devices for purposes of controlling aspects of the graphical user interface, including items or objects shown on the interface. For example, a user may perform item selection using a graphical user interface, such as for entering letters or phrases into the graphical user interface, or for advancing a graphical user interface through one or more menus. As another example, a user may input data using a graphical user interface such as by directing input using a virtual keyboard or keypad. Graphical user interfaces may be displayed to a user on one or more display devices, such as a monitor, television, etc. Graphical user interfaces may be interactive or non-interactive. For example, a graphical user interface may include an input or navigation portion, such as including a grid or arrangement of interactive virtual buttons or selection elements. Additionally or alternatively, portions of a graphical user interface may be used for displaying media content, such as static images or video, which may not be interactive, for example.

A user may enter or otherwise select one or more letters or words into an input device to navigate a graphical user interface. However, the input may only represent a subset of a longer string of letters or words that the user intends to input over a longer period of time. Therefore, the input may be interpreted to be only the beginning of one of one or more longer strings of letters or words. The graphical user interface may display a single selection or a list of words or phrases in response to the input from the user based on this interpretation. Accurate interpretation of the input may allow the graphical user interface to more efficiently and accurately display a list of words or phrases that more accurately reflect the user's intent.

The data received and/or gathered to accurately interpret the input may come from a variety of different sources. For example, the data may include predetermined data related to the use of the graphical user interface. For example, if the graphical user interface is a receiver interface of a television receiver, the data may include data related to television shows, movies, popular culture, etc. In another example, other data may include historical data gathered over time related to the user and the user's actions taken when interacting with the graphical user interface. In another example, other data may include environmental data related to the day, time, or other environmental conditions that the graphical user interface is in at the time.

FIG. 1 illustrates an embodiment of a satellite television distribution system 100. While embodiments detailed herein may be applied to various television distribution systems, including cable and IP, a satellite television distribution system is provided as an example. Satellite television distribution system 100 may include: television service provider system 110, satellite transmitter equipment 120, satellites 130, satellite dish 140, television receiver 150, and display device 160. Alternate embodiments of satellite television distribution system 100 may include fewer or greater numbers of components. While only one satellite dish 140, television receiver 150, and display device 160 (collectively referred to as "user equipment") are illustrated, it should be understood that multiple (e.g., tens, thousands, millions) instances of user equipment may receive television signals from satellites 130.

Television service provider system 110 and satellite transmitter equipment 120 may be operated by a television service provider. A television service provider may distribute television channels, on-demand programming, programming information, and/or other services to users. Television service provider system 110 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites via transponder streams. Satellite transmitter equipment 120 may be used to transmit a feed of one or more television channels from television service provider system 110 to one or more satellites 130. While a single television service provider system 110 and satellite transmitter equipment 120 are illustrated as part of satellite television distribution system 100, it should be understood that multiple instances of transmitter equipment may be used, possibly scattered geographically to communicate with satellites 130. Such multiple instances of satellite transmitting equipment may communicate with the same or with different satellites. Different television channels may be transmitted to satellites 130 from different instances of transmitting equipment. For instance, a different satellite dish of satellite transmitter equipment 120 may be used for communication with satellites in different orbital slots.

Satellites 130 may be configured to receive signals, such as streams of television channels, from one or more satellite uplinks such as satellite transmitter equipment 120. Satellites 130 may relay received signals from satellite transmitter equipment 120 (and/or other satellite transmitter equipment) to multiple instances of user equipment via transponder streams. Different frequencies may be used for uplink signals 170 from transponder stream 180. Satellites 130 may be in geosynchronous orbit. Each satellite 130 may be in a different orbital slot, such that the signal paths between each satellite, transmitter equipment, and user equipment vary. Multiple satellites 130 may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130-1. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite transmitter equipment 120, and/or satellites 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 2:
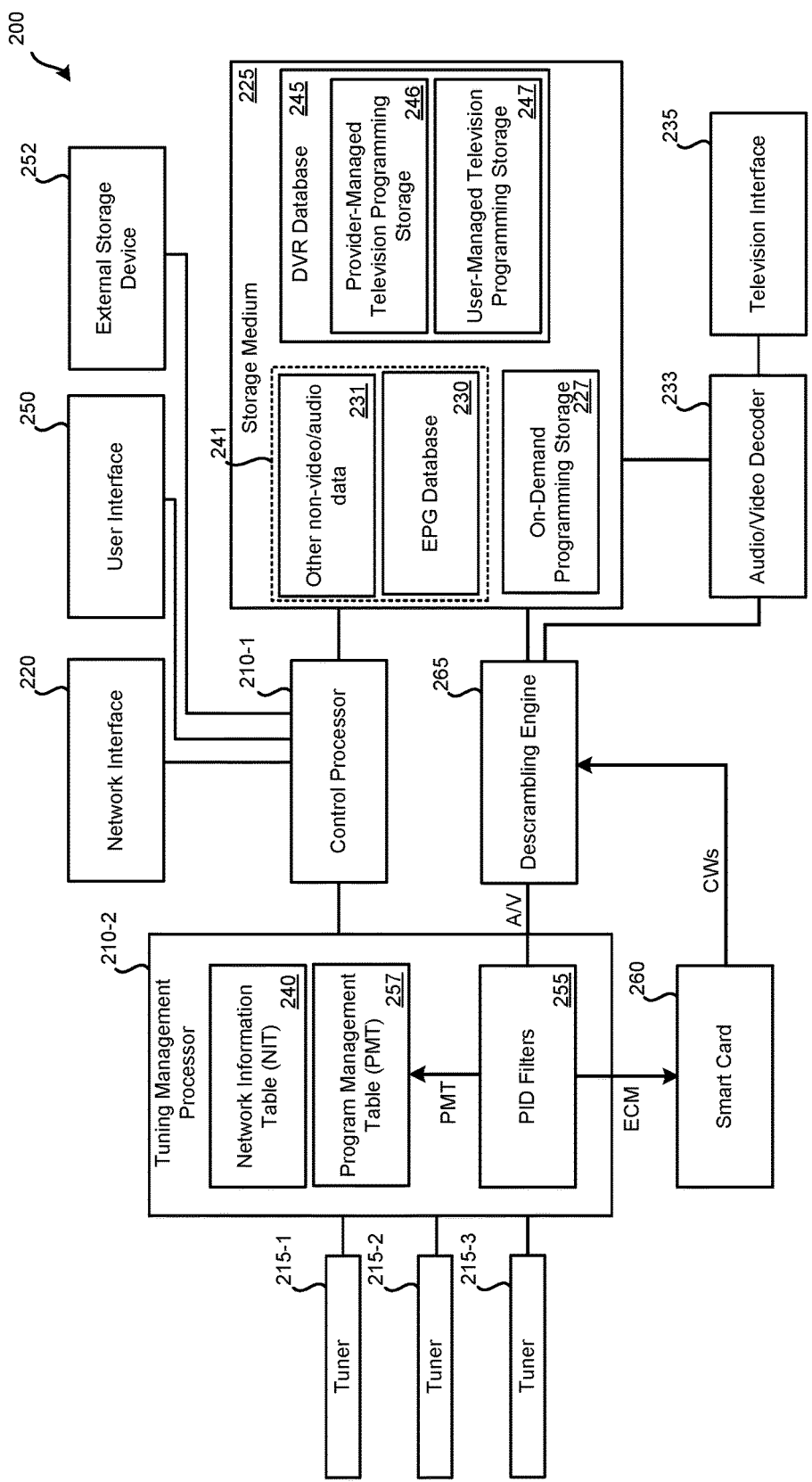
FIG. 2 illustrates an embodiment of a television receiver that is configured to manage storage space.

In communication with satellite dish 140 may be one or more sets of receiving equipment. Receiving equipment may be configured to decode signals received from satellites 130 via satellite dish 140 for display on a display device, such as display device 160. Receiving equipment may be incorporated as part of a television or may be part of a separate device, commonly referred to as a set-top box (STB). Receiving equipment may include a satellite tuner configured to receive television channels via a satellite. In FIG. 1, receiving equipment is present in the form of television receiver 150. As such, television receiver 150 may decode signals received via satellite dish 140 and provide an output to display device 160. FIG. 2 provides additional detail of a television receiver. A television receiver is defined to include set-top boxes (STBs) and also circuitry having similar functionality that may be incorporated with another device. For instance, circuitry similar to that of a television receiver may be incorporated into a television. As such, while FIG. 1 illustrates an embodiment of television receiver 150 as separate from display device 160, it should be understood that in other embodiments, similar functions may be performed by a television receiver integrated with display device 160.

Display device 160 may be used to present video and/or audio decoded by television receiver 150. Television receiver 150 may also output a display of one or more interfaces to display device 160, such as an electronic programming guide (EPG). In some embodiments, a display device other than a television may be used. Display device 160 may be a television, monitor, or some other device configured to display video and, possibly, play audio.

Uplink signal 170-1 represents a signal between satellite transmitter equipment 120 and satellite 130-1. Uplink signal 170-2 represents a signal between satellite transmitter equipment 120 and satellite 130-2. Each of uplink signals 170 may contain streams of one or more different television channels. For example, uplink signal 170-1 may contain a certain group of television channels, while uplink signal 170-2 contains a different grouping of television channels. Each of these television channels may be scrambled such that unauthorized persons are prevented from accessing the television channels.

Transponder stream 180-1 represents a signal between satellite 130-1 and satellite dish 140. Transponder stream 180-2 represents a signal path between satellite 130-2 and satellite dish 140. Each of transponder streams 180 may contain one or more different television channels in the form of transponder streams, which may be at least partially scrambled. For example, transponder stream 180-1 may include a first transponder stream containing a first group of television channels, while transponder stream 180-2 may include a second transponder stream containing a different group of television channels. A satellite may transmit multiple transponder streams to user equipment. For example, a typical satellite may relay thirty-two transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180-1 and transponder stream 180-2 being received by satellite dish 140. For a first group of television channels, satellite dish 140 may receive a transponder stream of transponder stream 180-1; for a second group of channels, a transponder stream of transponder stream 180-2 may be received. Television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Network 190 may serve as a secondary communication channel between television service provider system 110 and television receiver 150. Via such a secondary communication channel, bidirectional exchange of data may occur. As such, data may be transmitted to television service provider system 110 via network 190. Data may also be transmitted from television service provider system 110 to television receiver 150 via network 190. Network 190 may be the Internet. While audio and video services may be provided to television receiver 150 via satellites 130, feedback from television receiver 150 to television service provider system 110 may be transmitted via network 190.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems.

FIG. 2 illustrates an embodiment of television receiver 200, which may typically be in the form of a separate device configured to be connected with a presentation device, such as a television. Embodiments of television receiver 200 may include set top boxes (STBs). As previously noted, in addition to being in the form of an STB, a television receiver may be incorporated into another device, such as a television. For example, a television may have an integrated television receiver (which does not involve an external STB being coupled with the television). An STB may contain some or all of the components of television receiver 200 and/or may be able to perform some or all of the functions of television receiver 200. Accordingly, instances in this document referring to an STB and steps being performed by an STB may also be performed, more generally, by a television receiver.

FIG. 2 illustrates a block diagram of an embodiment of television receiver 200 that is configured to record omnibus channel files and extract a television program from a recorded omnibus channel file. Television receiver 200 may be the television receiver of FIG. 1 and may be in the form of an STB that communicates with a display device such as a television. Television receiver 200 may be incorporated as part of a television, such as display device 160 of FIG. 1. Television receiver 200 may include: processors 210 (which may include control processor 210-1 and tuning management processor 210-2), tuners 215, network interface 220, non-transitory computer-readable storage medium 225, electronic programming guide (EPG) database 230, television interface 235, networking information table (NIT) 240, digital video recorder (DVR) database 245 (which may include provider-managed television programming storage 246 and/or user-defined television programming 247), on-demand programming 227, user interface 250, external storage device 252, PID filters 255, smart card 260, and/or descrambling engine 265. In other embodiments of television receiver 200, fewer or greater numbers of components may be present. It should be understood that the various components of television receiver 200 may be implemented using hardware, firmware, software, and/or some combination thereof. Functionality of components may be combined; for example, functions of descrambling engine 265 may be performed by tuning management processor 210-2. Further, functionality of components may be spread among additional components; for example, PID filters 255 may be handled by separate hardware from program management table 257.

Processors 210 may include one or more specialized and/or general-purpose processors configured to perform processes such as tuning to a particular channel, accessing and displaying EPG information from EPG database 230, and/or receiving and processing input from a user. For example, processors 210 may include one or more processors dedicated to decoding video signals from a particular format, such as MPEG, for output and display on a television and for performing decryption. It should be understood that the functions performed by various modules of FIG. 2 may be performed using one or more processors. As such, for example, functions of descrambling engine 265 may be performed by control processor 210-1.

Control processor 210-1 may communicate with tuning management processor 210-2. Control processor 210-1 may control the recording of television channels based on timers stored in DVR database 245. Control processor 210-1 may initiate recording of a television channel by sending a record command along with an indication of the television channel to be recorded to tuning management processor 210-2. Control processor 210-1 may not send a second record command (if additional recording is to begin at the same time) until an acknowledgement that recording of the first television channel has successfully been received and initiated by tuning management processor 210-2. Control processor 210-1 may also provide commands to tuning management processor 210-2 when recording of a television channel is to cease. In addition to providing commands relating to the recording of television channels, control processor 210-1 may provide commands to tuning management processor 210-2 that indicate television channels to be output to audio/video decoder 233 for output to a presentation device, such as a television.

Control processor 210-1 may also communicate with network interface 220 and user interface 250. Control processor 210-1 may handle incoming data from network interface 220 and user interface 250. Additionally, control processor 210-1 may be configured to output data via network interface 220.

Tuners 215 may include one or more tuners used to tune to television channels, such as television channels transmitted via satellite or cable. In the illustrated embodiment of television receiver 200, three tuners are present (tuner 215-1, tuner 215-2, and tuner 215-3). Each tuner contained in tuners 215 may be capable of receiving and processing a single stream of data from a satellite transponder (or a cable RF channel) at a given time. As such, a single tuner may tune to a single transponder (or, for a cable network, a single cable RF channel). If tuners 215 include multiple tuners, one tuner may be used to tune to a television channel on a first transponder stream for display using a television, while another tuner may be used to tune to a television channel on a second transponder for recording and viewing at some other time. Still another tuner may be used to check various television channels to determine if they are available or not. If multiple television channels transmitted on the same transponder stream are desired, a single tuner of tuners 215 may be used to receive the signal containing the multiple television channels for presentation and/or recording. Tuners 215 may receive commands from tuning management processor 210-2. Such commands may instruct tuners 215 which frequencies are to be used for tuning.

Network interface 220 may be used to communicate via an alternate communication channel with a television service provider. For example, the primary communication channel may be via satellite (which may be unidirectional to the STB) and the alternate communication channel (which may be bidirectional) may be via a network, such as the Internet. Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 2, network interface 220 may be configured to communicate via one or more networks, such as the Internet, to communicate with television service provider system 110 of FIG. 1. Information may be transmitted and/or received via network interface 220.

Storage medium 225 may represent a non-transitory computer-readable storage medium. Storage medium 225 may include memory and/or a hard drive. Storage medium 225 may be used to store information received from one or more satellites and/or information received via network interface 220. Storage medium 225 may store information related to EPG database 230, other non-video/audio data 231, DVR database 245, and/or on-demand programming 227. Recorded television programs may be stored using storage medium 225 as part of DVR database 245. Storage medium 225 may be partitioned or otherwise divided (such as into folders) such that predefined amounts of storage medium 225 are devoted to storage of television programs recorded due to user-defined timers and stored of television programs recorded due to provider-defined timers.

EPG database 230 may store information related to television channels and the timing of programs appearing on such television channels. EPG database 230 may be stored using storage medium 225, which may be a hard drive. Information from EPG database 230 may be used to inform users of what television channels or programs are popular and/or provide recommendations to the user. Information from EPG database 230 may provide the user with a visual interface displayed by a television that allows a user to browse and select television channels and/or television programs for viewing and/or recording. Information used to populate EPG database 230 may be received via network interface 220 and/or via satellites, such as satellites 130 of FIG. 1 via tuners 215. For instance, updates to EPG database 230 may be received periodically via satellite. EPG database 230 may serve as an interface for a user to control DVR functions of television receiver 200, and/or to enable viewing and/or recording of multiple television channels simultaneously.

In addition to being used to provide users with information about scheduled programming, information from EPG database 230 may be used to determine when television programs begin and end for the purposes of recording. For instance, if a channel-specific file is recorded that contains multiple television programs, the start and end of time of specific television programs within the channel-specific file may be based on the start and end times indicated in the EPG. Other data may be stored for the EPG that may be useful in managing channel-specific files, such as series identifiers and episode identifiers (which may be used by a television service provider to identify particular television programs).

The network information table (NIT) 240 may store information used by television receiver 200 to access various television channels. NIT 240 may be stored locally by a processor, such as tuning management processor 210-2 and/or by storage medium 225. Information used to populate NIT 240 may be received via satellite (or cable) through tuners 215 and/or may be received via network interface 220 from the television service provider. As such, information present in NIT 240 may be periodically updated. In some embodiments, NIT 240 may be locally-stored by television receiver 200 using storage medium 225. Generally, NIT 240 may store information about a service provider network, such as a satellite-based service provider network. Information that may be present in NIT 240 may include: television channel numbers, satellite identifiers, frequency identifiers and/or transponder identifiers for various television channels. In some embodiments, NIT 240 may contain additional data or additional tables may be stored by the television receiver. For example, specific audio PIDs and video PIDs may not be present in NIT 240, a channel identifier may be present within NIT 240 which may be used to look up the audio PIDs and video PIDs in another table, such as a program map table (PMT). In some embodiments, a PID associated with the data for the PMT is indicated in a separate table, program association table (PAT), which is not illustrated in FIG. 2. A PAT may be stored by the television receiver in a similar manner to the NIT. For example, a PMT may store information on audio PIDs, and/or video PIDs. A PMT store data on ECM (entitlement control message) PIDs for television channels that are transmitted on a transponder frequency.

Table 1 provides a simplified example of NIT 240 for several television channels. It should be understood that in other embodiments, many more television channels may be represented in NIT 240. NIT 240 may be periodically updated by a television service provider. As such, television channels may be reassigned to different satellites and/or transponders, and television receiver 200 may be able to handle this reassignment as long as NIT 240 is updated.

TABLE 1

| Channel | Satellite | Transponder |
| --- | --- | --- |
| 4 | 1 | 2 |
| 5 | 2 | 11 |
| 7 | 2 | 3 |
| 13 | 2 | 4 |

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

It should be understood that the values provided in Table 1 are for example purposes only. Actual values, including how satellites and transponders are identified, may vary. Additional information may also be stored in NIT 240.

While a large portion of storage space of storage medium 225 is devoted to storage of television programming, a portion 241 may be devoted to storage of non-audio/video data, such as EPG database 230 and other non-video/audio data 231. This "other" data may permit television receiver 200 to function properly. In some embodiments, at least ten gigabytes are allocated to such other data. For example, if NIT 240 is stored by storage medium 225, it may be part of other non-video/audio data 231.

Audio/video decoder 233 may serve to convert encoded video and audio into a format suitable for output to a display device. For instance, audio/video decoder 233 may receive MPEG video and audio from storage medium 225 or descrambling engine 265 to be output to a television. MPEG video and audio from storage medium 224 may have been recorded to DVR database 245 as part of a previously-recorded television program. Audio/video decoder 233 may convert the MPEG video and audio into a format appropriate to be displayed by a television or other form of display device and audio into a format appropriate to be output from speakers, respectively.

Television interface 235 may serve to output a signal to a television (or another form of display device) in a proper format for display of video and playback of audio. As such, television interface 235 may output one or more television channels, stored television programming from storage medium 225 (e.g., television programs from DVR database 245, television programs from on-demand programming 227 and/or information from EPG database 230) to a television for presentation.

Digital Video Recorder (DVR) functionality may permit a television channel to be recorded for a period of time. DVR functionality of television receiver 200 may be managed by control processor 210-1. Control processor 210-1 may coordinate the television channel, start time, and stop time of when recording of a television channel is to occur. DVR database 245 may store information related to the recording of television channels. DVR database 245 may store timers that are used by control processor 210-1 to determine when a television channel should be tuned to and its programs recorded to DVR database 245 of storage medium 225. In some embodiments, a limited amount of storage medium 225 may be devoted to DVR database 245. Timers may be set by the television service provider and/or one or more users of television receiver 200.

The DVR functionality of control processor 210-1 may have multiple modes. First, the DVR functionality of control processor 210-1 may be configured to record individual television programs selected by a user to user-defined television programming 247. Such user-defined television programming 247 may be recorded based on user-defined timers. Each user-defined timer is set by a user and specifies a date, television channel, and a time period for recording. User-defined television programming 247, in addition to including audio and video data for the television program, may include data about the recording, such as a time and/or date of when the television program was recorded, whether the television program has been designated as protected, and EPG information. To create a user-defined timer, a user may select a particular television program via a graphically-displayed EPG. Based on the date, time period, and television channel indicated by EPG database 230, Control processor 210-1 may record the associated television program to user-managed television programming storage 247 of DVR database 245. In some embodiments, a series identifier and episode identifier may be used to schedule a timer to record the broadcast of a television program.

DVR database 245 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 200 via the television provider's network. For example, referring to system 100 of FIG. 1, in a satellite-based television service provider system, data necessary to create the provider-defined timers at television receiver 150 may be received via satellite.

As an example of DVR functionality of television receiver 200 being used to record based on provider-defined timers, a television service provider may configure television receiver 200 to record television programming on multiple, predefined television channels for a predefined period of time, on predefined dates. For instance, a television service provider may configure television receiver 200 such that television programming may be recorded from 7 to 10 PM on NBC, ABC, CBS, and FOX on each weeknight and from 6 to 10 PM on each weekend night on the same channels. If a television program is selected for recording by a user and is also specified for recording by the television service provider, the user selection may serve as an indication to save the television program for an extended time (beyond the time which the predefined recording would otherwise be saved). Television programming recorded based on provider-defined timers may be stored to provider-managed television programming storage 246.

Storage space of storage medium 225 may be allocated among provider-managed television programming storage 246 and user-managed television programming storage 247. For instance, space that is allocated to provider-managed television programming storage 246 may be reallocated to user-managed television programming storage 247; the reverse may also be possible. Reallocation may occur based on user-preferences and/or service provider propagated settings.

On-demand programming 227 may represent additional television programming stored by storage medium 225. On-demand programming 227 may include television programming that was not recorded to storage medium 225 via a timer (either user- or provider-defined). Rather, on-demand programming is programming provided to the television receiver directly for storage by the television receiver and for later presentation to one or more users. In some systems, such as cable and IP-based television distribution networks, on-demand content is requested by a television receiver and retrieved from a remote server in response to a user requesting the on-demand content. In other systems, such as systems in which bandwidth is at a premium and/or communication to the television receiver is one-way (e.g., satellite-based television distribution networks), on-demand content may be pre-loaded to a television receiver for the possibility of a user requesting the on-demand content. On-demand content may be "free" (e.g., included in the cost of a user's subscription with the television service provider) or may be pay-per-view (e.g., a movie that costs an amount of money to be viewed). On-demand programming 227 may not be user-selected. As such, the television programming stored to on-demand programming storage 227 may be the same for each television receiver of a television service provider. In some embodiments, programming stored to on-demand programming storage 227 may be standardized based on a manufacturer and/or model of television receiver (e.g., television receivers of the same make and/or model store the same on-demand programming). What on-demand programming and for how long such on-demand programming is retained by the television receiver may be determined based on settings propagated by the television service provider.

Storage space of storage medium 225 may also be allocated among provider-managed television programming storage 246, user-managed television programming storage 247, and on-demand programming storage 227. For instance, space may be allocated among provider-managed television programming storage 246, user-managed television programming storage 247, and/or on-demand programming storage 227. Reallocation may occur based on user-preferences and/or service provider propagated settings.

User interface 250 may include a remote control (physically separate from television receiver 200) and/or one or more buttons on television receiver 200 that allow a user to interact with television receiver 200. User interface 250 may be used to select a television channel for viewing, view information from EPG database 230, and/or program a timer stored to DVR database 245, wherein the timer is used to control the DVR functionality of control processor 210-1.

Referring back to tuners 215, television channels received via satellite (or cable) may contain at least some scrambled data. Packets of audio and video may be scrambled to prevent unauthorized users (e.g., nonsubscribers) from receiving television programming without paying the television service provider. When a tuner of tuners 215 is receiving data from a particular transponder of a satellite, the transponder stream may be a series of data packets corresponding to multiple television channels. Each data packet may contain a packet identifier (PID), which, in combination with NIT 240 and/or PMT 257, can be determined to be associated with particular television channel. Particular data packets, referred to as entitlement control messages (ECMs) may be periodically transmitted. ECMs may be associated with another PID and may be encrypted; television receiver 200 may use smart card 260 to decrypt ECMs. Decryption of an ECM may only be possible if the user has authorization to access the particular television channel associated with the ECM. When an ECM is determined to correspond to a television channel being stored and/or displayed, the ECM may be provided to smart card 260 for decryption.

When smart card 260 receives an encrypted ECM, smart card 260 may decrypt the ECM to obtain some number of control words. In some embodiments, from each ECM received by smart card 260, two control words are obtained. In some embodiments, when smart card 260 receives an ECM, it compares the ECM to the previously received ECM. If the two ECMs match, the second ECM is not decrypted because the same control words would be obtained. In other embodiments, each ECM received by smart card 260 is decrypted; however, if a second ECM matches a first ECM, the outputted control words will match; thus, effectively, the second ECM does not affect the control words output by smart card 260. Smart card 260 may be permanently part of television receiver 200 or may be configured to be inserted and removed from television receiver 200.

Tuning management processor 210-2 may be in communication with tuners 215 and control processor 210-1. Tuning management processor 210-2 may be configured to receive commands from control processor 210-1. Such commands may indicate when to start/stop recording a television channel and/or when to start/stop causing a television channel to be output to a television. Tuning management processor 210-2 may control tuners 215. Tuning management processor 210-2 may provide commands to tuners 215 that instruct the tuners which satellite, transponder, and/or frequency to tune to. From tuners 215, tuning management processor 210-2 may receive transponder streams of packetized data. As previously detailed, some or all of these packets may include a PID that identifies the content of the packet.

Tuning management processor 210-2 may be configured to create one or more PID filters 255 that sort packets received from tuners 215 based on the PIDs. When a tuner is initially tuned to a particular frequency (e.g., to a particular transponder of a satellite) a PID filter may be created based on the PMT data. The PID created based on the PMT data packets may be known because it is stored as part of NIT 240 or another table, such as a program association table (PAT). From the PMT data packets, PMT may be constructed by tuning management processor 210-2. Table 2 provides an exemplary extract of a PMT. PMT 257 may be specific to a television channel on a transponder. As such, if tuning to a different television channel or transponder occurs, a new PMT may be created for the different transponder.

TABLE 2

| Channel | Video PID | $1^{st}$ Audio PID | $2^{nd}$ Audio PID |
|---|---|---|---|
| 4 | 1003 | 2383 | 2119 |
| 5 | 2993 | 2727 | 2728 |
| 7 | 9238 | 1233 | 0129 |
| 13 | 0012 | 9348 | — |

Accordingly, based on the information present in PMT 257, the audio and video PIDs for specific television channels may be identified. A television channel may have multiple audio PIDs due to a second audio program (SAP), which may be in a different language.

It should be understood that the values provided in Table 2 are for example purposes only. Actual values may vary. Additional information or less information may also be stored in PMT 257.

PID filters 255 may be configured to filter data packets based on PIDs. In some embodiments, PID filters 255 are created and executed by tuning management processor 210-2. In other embodiments, separate hardware may be used to create and execute such PID filters. Depending on a television channel selected for recording/viewing, a PID filter may be created to filter the video and audio packets associated with the television channel (based on the PID assignments present in PMT 257). For example, if a transponder data stream includes multiple television channels, data packets corresponding to a television channel that is not desired to be stored or displayed by the user may be ignored by PID filters 255. As such, only data packets corresponding to the one or more television channels desired to be stored and/or displayed may be filtered and passed to either descrambling engine 265 or smart card 260; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 240, may be appropriately routed by PID filters 255. At a given time, one or multiple PID filters may be executed by tuning management processor 210-2.

Descrambling engine 265 may use the control words output by smart card 260 in order to descramble video and/or audio corresponding to television channels for storage and/or presentation. Video and/or audio data contained in the transponder data stream received by tuners 215 may be scrambled. Video and/or audio data may be descrambled by descrambling engine 265 using a particular control word. Which control word output by smart card 260 to be used for successful descrambling may be indicated by a scramble control identifier present within the data packet containing the scrambled video or audio. Descrambled video and/or audio may be output by descrambling engine 265 to storage medium 225 for storage (in DVR database 245) and/or to audio/video decoder 233 for output to a television or other presentation equipment via television interface 235.

External storage device 252 may represent an external, detachable computer-readable non-transitory storage device. The storage device may be memory, a hard drive, or some other type of device for storing computer-readable data. The user may be permitted to connect and disconnect external storage device 252 to increase and decrease an amount of storage space available for storing on-demand programming, service provider-managed television programming, and/or user managed television programming. When external storage device 252 is connected to television receiver 200, storage space on storage medium 225 may be reallocated based on additional storage space now being present on external storage device 252. As such, from the viewpoint of a user, additional space may be available for television programming recorded using user-defined timers. If an external storage device 252 is connected to a television receiver 200, external storage device 252 may be used for provider-managed television programming storage 246 with DVR database 245 being dedicated to user-managed television programming storage 247 (the reverse is also possible). As such, external storage device 252 may be used to isolate provider managed television programming from user managed television programming. Alternatively, television programming recorded due to provider-managed timers and user-managed timers may be stored on both DVR database 245 and external storage device 252. In some embodiments, when DVR database 245 becomes full, the recorded television programs may begin being written to external storage device 252. If an external storage device 252 is removed from being connected with television receiver 200, storage space on storage medium 225 may be reallocated to compensate for the loss of storage space. As such, if the total amount of space needed to be dedicated to on-demand programming storage 227 and television programs recorded based on provider-managed timers remains constant, television programming recorded due to user-managed timers may be deleted (or space available to record such programming may be decreased) to make sufficient storage space available on storage medium 225 for on-demand programming storage 227 and provider-managed television programming storage 246.

For simplicity, television receiver 200 of FIG. 2 has been reduced to a block diagram; commonly known parts, such as a power supply, have been omitted. Further, some routing between the various modules of television receiver 200 has been illustrated. Such illustrations are for exemplary purposes only. The state of two modules not being directly or indirectly connected does not indicate the modules cannot communicate. Rather, connections between modules of the television receiver 200 are intended only to indicate possible common data routing. It should be understood that the modules of television receiver 200 may be combined into a fewer number of modules or divided into a greater number of modules. Further, the components of television receiver 200 may be part of another device, such as built into a television. Also, while television receiver 200 may be used to receive, store, and present television channels received via a satellite, it should be understood that similar components may be used to receive, store, and present television channels via a cable network.

Figure 3:
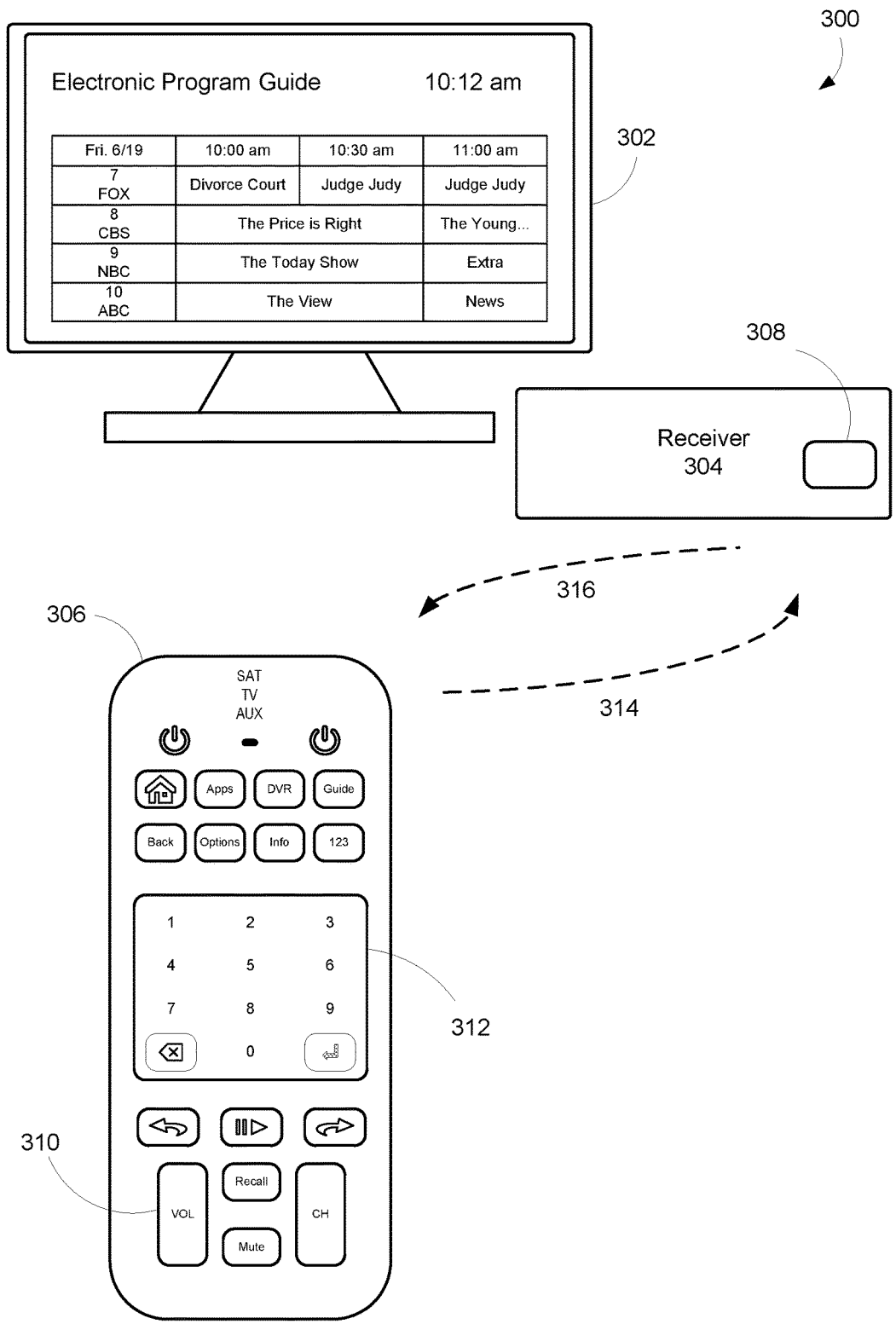
FIG. 3 illustrates an example television display configuration, in accordance with some embodiments.

FIG. 3 illustrates an example television display configuration 300, in accordance with some embodiments. Television display configuration 300 includes television 302, receiver 304 and remote control 306. Television 302 may, for example, represent television 160 illustrated in FIG. 1, or another non-television display device, such as a computer monitor. Television 302 displays a graphical user interface, exemplified as a receiver interface provided by television receiver 304.

As will be understood by the skilled artisan, video signal encoding hardware present within receiver 304 may encode a video signal, such as including the receiver interface and/or television video programming, which is output from the receiver 304. In embodiments, the video signal may be a digital video signal or an analog video signal, which may be provided to television 302, such as using one or more signal cables, such as a composite, S-video, high-definition multimedia interface (HDMI) or other digital or analog signal cable. Embodiments are contemplated where a video signal is provided from receiver 304 to television 302 by way of one or more networks or one or more intermediate devices. Optionally, a video signal may be provided in an uncompressed form or in a compressed form. Upon receiving the video signal, television receiver may decode or otherwise process the video signal for display on the screen of television 302.

Receiver 304 includes remote control interface 308 for receiving commands from remote control 306. Remote control interface 308 may be exemplified by a variety of hardware, such as for wirelessly receiving commands from remote control 306. Wireless remote commands may be received, for example, using one or more wireless technologies, such as optical, infrared or radio frequency electromagnetic technologies. In one embodiment, remote control interface 308 includes an infrared receiver and remote control 306 includes an infrared transmitter. In another embodiment, remote control interface 308 includes a Bluetooth receiver and remote control 306 includes a Bluetooth transmitter. Other examples are possible. Optionally, remote commands from remote control 306 may be received over a wired connection at remote control interface 308.

Remote control 306 is illustrated as including a plurality of buttons 310, as will be understood by the skilled artisan, for communicating any of a set of remote commands to receiver 304 by way of remote control interface 308. Remote control 306 could further include an interface itself, such as interface 312, which may include a touchpad or trackpad type interface. Interface 312 could include one or more graphics on the surface, such as numerals or other symbols. Interface 312 may also be useful for generation of coordinates corresponding to locations of the remote control 306 at which inputs are received. For example, coordinates may be generated by interface 312 that correspond to the location on the interface at which a user's finger contacts the surface of the interface. Interface 312 may also include one or more buttons which may be clickable, as will be understood by the skilled artisan, to allow the interface to register button presses, which may be communicated and/or interpreted as selection or confirmation signals, in addition to location coordinates. Inputs at buttons 310 or an interface 312 may be transmitted by remote control 306, via communication path 314, for receipt at remote control interface 308. Data may also be transmitted by receiver 304 to remote control 306 via communication path 316.

Other remote control types are envisioned, including, but not limited to gesture based devices, such as including one or more gyroscopic sensors, one or more accelerometers, one or more video or optical sensors, one or more depth sensors, one or more range sensors, and/or one or more motion sensors.

Figure 4:
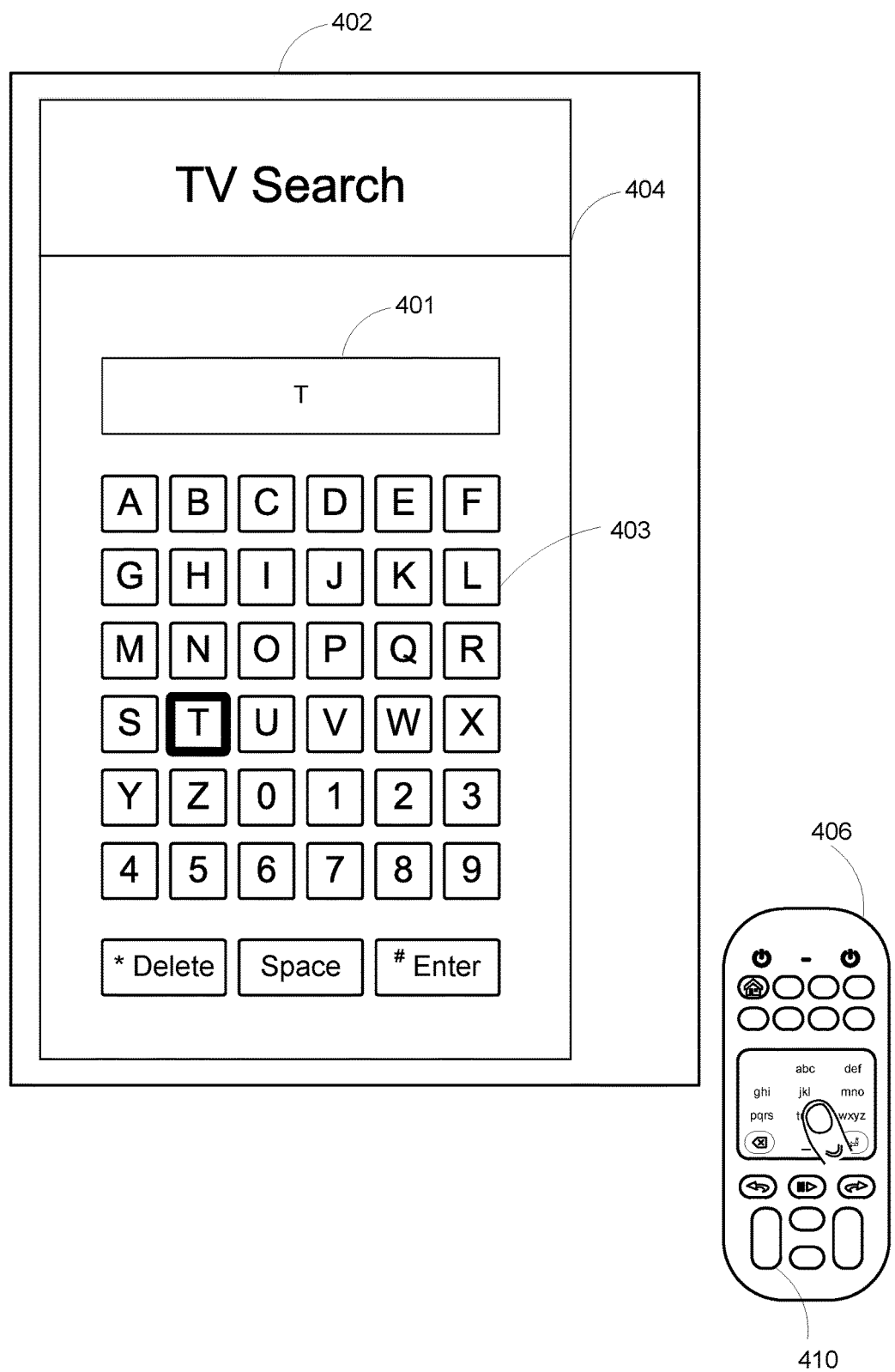
FIG. 4 illustrates an embodiment showing a receiver interface with a TV search mechanism for entry of data and a remote control, according to some embodiments.

FIG. 4 illustrates an embodiment showing a receiver interface 402 with a TV search mechanism 404 for entry of data and a remote control 406, according to some embodiments. As illustrated, receiver interface 402 shows a virtual keyboard 403 for entry of text into a search box 401. The search box may be used, as will be described further herein, to search through an EPG or database within a television receiver associated with receiver interface 402. Characters may be selectable, such as using remote control 406. Further aspects of FIG. 4 illustrate a user providing data to a television receiver, resulting in modification of receiver interface 402. When a user's finger makes contact with a button or interface of remote control 406, coordinates or other data may be generated by remote control 406 and transmitted to a television receiver, for example. When the data is received by a television receiver, the receiver interface 402 may be modified, such as to include an indicator at the virtual keyboard 403, here exemplified as a highlighted border around the character "T", and/or search box 401, here exemplified as the letter "T" in search box 401. If remote control 406 includes a touch sensitive interface, for example, then a cursor or other indicator may move on the receiver interface 402 (e.g., on the virtual keyboard 403) in a way that corresponds to movement of the user's finger on the interface of remote control 406. In such an example, when the user presses down on a button associated with the interface, data associated with these respective locations may be transmitted to the television receiver. When data is received by the television receiver, again the receiver interface 402 may be modified, such as to include an indicator at the virtual keyboard 403, here exemplified as a highlighted border around the character "T", and/or search box 401, here exemplified as the letter "T" in search box 401.

Figure 5:
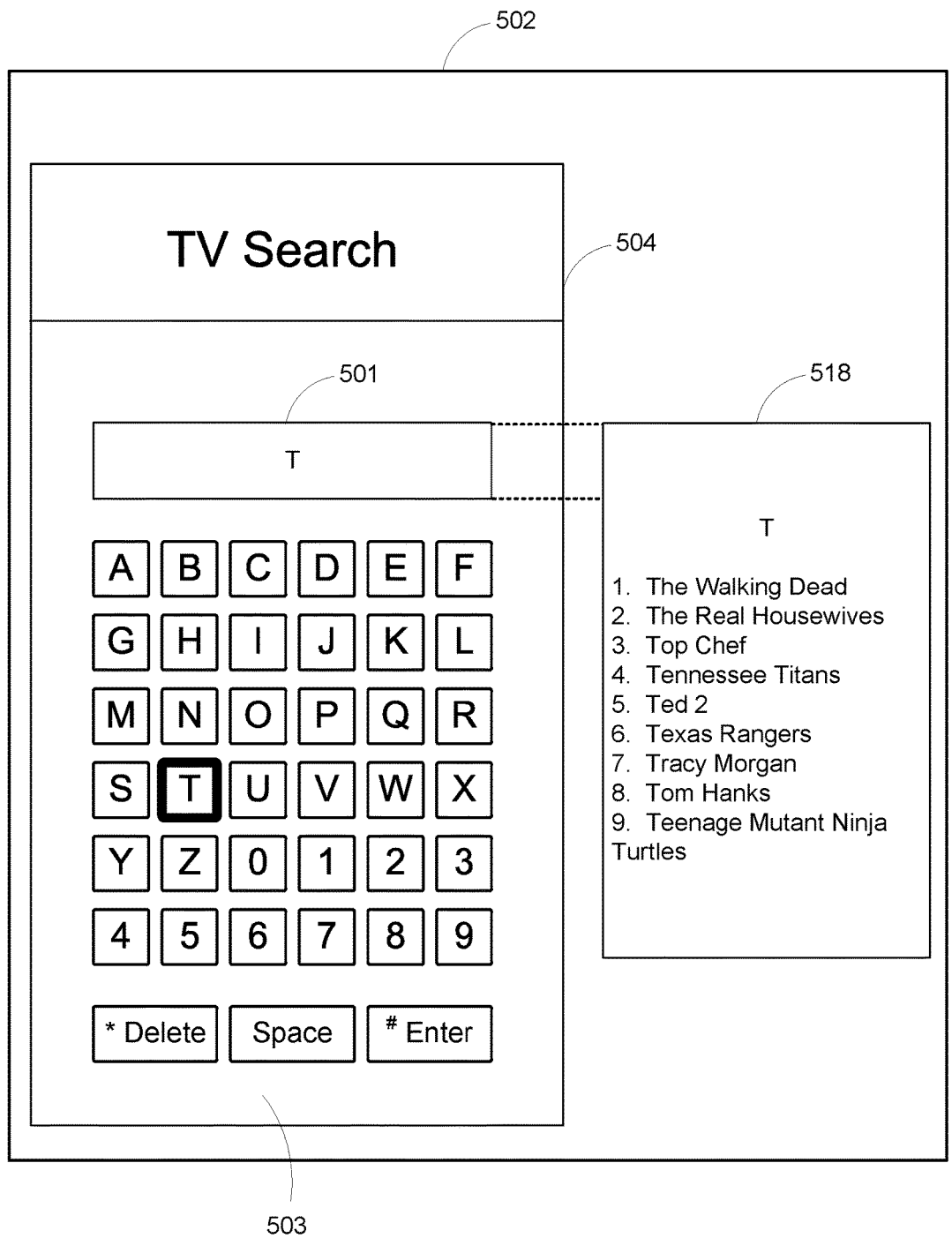
FIG. 5 illustrates an embodiment showing a receiver interface with a TV search interface for entry of data and a search results interface, according to some embodiments.

FIG. 5 illustrates an embodiment showing a receiver interface 502 with a TV search interface 504 for entry of data and a search results interface 518, according to some embodiments. Receiver interface 502 shows a virtual keyboard 503 for entry of text into a search box 501. Characters may be selectable using, for example, a remote control, such as remote control 406 shown in FIG. 4. When a user makes a selection, including a letter or number, the virtual keyboard may light up or otherwise show selection of that letter or number, and the selection may be shown in the search box 501, and/or may be shown in the results interface 518.

Results interface 518 includes a visualization of the dynamic search process utilized in embodiments of the present technology. As a selection is made by the user, the results interface 518 may display a list of results that may be relevant to the user's selection. For example, as shown in FIG. 5, if the letter "T" is selected, then various results that include (e.g., start with) the letter "T" may be listed in the results list in search results interface 518. Additionally, instead of the result starting with "T", a word other than the first word of the result may start with "T". As a second and further letters and/or numbers are selected, the list of results may change based on the inputs. For example, if the letter "H" is entered after the letter "T", then various results that include (e.g., start with) the letters "Th" may be listed in the results list in search results interface 518. This process may repeat for additional letters. The list of results may include a variety of movies, television shows, sports teams, sporting events, events, etc. that include the letter "T", as shown in FIG. 5.

The list of results may be generated using a variety of different types of data and data from a variety of different sources. The results list may include the results in a certain order (e.g., by "ranking" or "rating"), and this order may also be determined using the variety of different types of data and data from a variety of different sources. For example, data related to a user actions taken when engaging with the receiver interface may be recorded and stored over time, such as shows that the user watches regularly, types of shows that the user watches regularly, previous searches that the user made, interests that the user indicates based on their actions engaging with the receiver interface, publically available profile information associated with the user (e.g. Facebook, Linkedin, Twitter, etc.), Common Sense data, among others. This data may be used to predict what the user may input into the receiver interface and/or what the user may want to watch. For example, if the user has watched a lot (e.g., greater than a certain threshold number of times or for greater than a certain threshold amount of time) of horror shows and movies, then the user may be interested in watching The Walking Dead. The user may also be interested in watching The Walking Dead if the user has regularly watched The Walking Dead in the past. Such data may be used to include The Walking Dead, or other similar shows or movies, in the results list. In another example, if the user is a child, the ranking of a show may go up or down based on children warnings associated with a show.

In another example, data from public sources may also be used to generate the results list. For example, data or information may be received or retrieved from online encyclopedia Wikipedia or other online sources of information. For example, external feeds for trending, such as Wikipedia page ranking, may be used. In another example, twitter rankings or trending information may be used. If a major event occurs in a celebrity's life, the weighting of that celebrity or shows or other programming may be boosted based on those events. Data regarding such events may be discovered through mining online sources of information. In another example, data related to popularity of a certain TV show, movie, actor/actress (or other celebrities), genre, etc. may be used. Data or information may be received or retrieved from rating websites such as IMDB, Rotten Tomatoes or other reviewing websites. Furthermore, data related to expected future popularity of a TV show, movie, actor/actress (or other celebrities), genre, etc. may also be used. For example, data may be generated related to a movie that the general public expects to be popular, and that data may be used to help generate the results list. In another example, data related to the environment in which the inputs are being made into the search interface may also be used. For example, data including the time of year (e.g., season, holiday, etc.), time of the month, day of the week, time of the day, etc. may all be used. For example, the system may generate a results list without football teams if the search is not being made during football season. In another example, the location of an event or other result may determine whether a result is included or the ranking of a result in the results list. For example, if an event is located in or near the location of the user, then the result may be included and/or moved higher in priority on the results list.

In another example, the location of the user of the television receiver may be used. For example, if the user is located in Denver, Colo., then results that are more relevant to such a user may be included in the results list. For example, if a user selects "B" as its first letter input, then the system may include the "Denver Broncos" in the results list for that user since that user is located in Denver, Colo., the city in which the Denver Broncos are based. However, on the other hand, if the user who selects "B" is located in Boston, Mass., then the Denver Broncos may not be included in the results list.

In another example, data related to a television receiver and/or television service provider system may be used. For example, information about scheduled programming and other information from a database, such as EPG database 230 in FIG. 2, may be used to help generate the results list. For example, the system may generate a results list without a certain television show if the television show is not airing new episodes during that time of year based on the scheduled programming provided by the television service provider system.

Other information related to scheduled programming may be used. For example, if the letter "T" is selected as an input, the system may determine how many potential results within each of a variety of categories (e.g., movies, television shows, sports, etc.) start with the letter "T". For example, the system may have set a certain number, or a maximum number, of results that may be included in the results list from one or more of the variety of categories. More specifically, the results list may be set to include a maximum of three movies in the results list. In such an example, the results may include a television show or sporting event in the results list even if a fourth movie is ranked higher than the television show or sporting event.

As noted, different results within a result list may include ratings or rankings relative to the other results in the result list. The order in which the results are listed in the results list may be determined by the rankings for each result. The rankings for the results may be determined based on the various data obtained by the television receiver system. Each possible result (e.g., a television show, movie, sports team, etc.) may be assigned a rating for a user based on that data. For example, if, based on the data associated with a user and the other objective data obtained, a user watches every new episode of a particular television show, then that television show may be ranked higher than a different television show that the user has never watched before. More specifically, if a user watches every episode of only one show, The Walking Dead, then The Walking Dead may have a higher ranking than a different show, such as Top Chef, of which the user only watches every other episode. In such a situation, The Walking Dead may be listed first in a results list for that user (as shown in FIG. 5).

The ratings/rankings of possible results may be dynamic, or may change over time (e.g., in real time), based on new or changing data obtained by the television receiver system. For example, obtained data may indicate that while the user watches a particular television show less often than others, that television show is not currently airing new episodes, is going off the air, or may have received bad ratings (or other examples of the data collected, as described herein). In such an example, another television show may be assigned a higher rating because of that data. Furthermore, certain data may be assigned more or less weight when assigning a rating to a potential user result. For example, data that is collected from a user or the user's actions may be given more weight than another type of data because it is specific to the user. More specifically, if data indicates that a user watches a certain television show on a regular basis even when the television show is not running new episodes, that data may be weighed higher than the data that indicates that the television show is not running new episodes. In such an example, the user has shown that even though the television show is not running new episodes, the user still watches the show regularly. Therefore, the data that indicates that the television show is not running new episodes is not as valuable or relevant than the data that indicates that the user watches the television show. A set of data, or a factor relevant for rankings to generate a results list, may be given a higher weight if the set of data is valuable or relevant, but may be given a lower weight if the set of data is not valuable or not relevant. In another example, a program may be weighted/ranked higher if a user binge watches a show (watches several episodes or seasons of the show in a short period of time) instead of casually watching the show over a longer period of time. More accurate weighting or rankings may be achieved by using a variety of different technologies, such as NLP, neural network processing, Bayesian statistics and networks, or other technologies.

Other data that may be used to determine programming rankings for a user may include recommendations for the user. For example, the system may use recommendations otherwise determined for a user based on the user's watching and/or preference data to determine where certain programming should be ranked (or how it should be weighted). Furthermore, a user's reviews (e.g. rating a certain show highly, or poorly) of certain shows may also be used to rank (or weight) those shows and associated shows. In turn, such reviews and the rankings/weightings may be used for recommendations so that the system may recommend shows for the user to watch next.

As noted, different television shows, video games, DVDs, celebrities, novels, and other possible results may have associations with each other. These associations may be assigned such that they are predetermined and stored. In another embodiment, these associations may be assigned in real time. For example, if a new data point is received related to a new possible result (e.g., a new movie, new television show, new actor, etc.), then the new possible result may be assigned associations to other possible results based on its relationship with them. A result may be associated with another result based on a direct relationship or based on an indirect relationship through other results. For example, an actor (or other celebrity) may be associated with a movie or a television show if the actor was in that movie or television show. In another example, an actor may be associated with another actor if the two actors worked together on a movie or a television show. In another example, an actor may be associated with a movie if an actress that was in the movie has acted with the actor in the past (e.g., on a regular basis and have a strong association). These associations may contribute to the rankings/ratings (or weighting) assigned to certain results, and may cause certain results to be a part of a results list together.

A results list displayable in search results interface 518 may be divided up into sets of slots, wherein each set may be designated to a different category of result (e.g., television shows, movies, sports teams, sporting events, events, among others). As noted, results may include a variety of programming, including television shows, movies, sports teams, sporting events, events, etc. The television receiver system may set a certain number of slot allocations for each category of result. For example, if the search results list is designated to include movies, television shows, and sports (e.g., teams, events, etc.), and nine total slots are included in the result list, the search results list may be designated to have exactly three movies, three television shows, and three sports-related results. However, the allocation of search result list slots may be dynamic, or may change over time (e.g., in real time), based on new or changing data obtained by the television receiver system. For example, if a user watches significantly more sports than movies or television shows, then the slots in the search result list may be dynamically changed so that more than three slots are allocated to sports. For example, five slots may be allocated to sports, two slots allocated to television shows, and two slots allocated to movies. More specifically, slots may be allocated to a certain category based on what percentage of television a user watches in each category. The percentage of television watched may be based on the number of programs watched in each category, may be based on the time watched in each category, or may be based on another predetermined ratio. In another example, the slots may be allocated based on certain watching thresholds being crossed. For example, the system may initiate a rule that if a user watches or otherwise selects programs in a certain category over a certain percentage of time, a certain number of slots will be allocated to that category.

Figure 6:
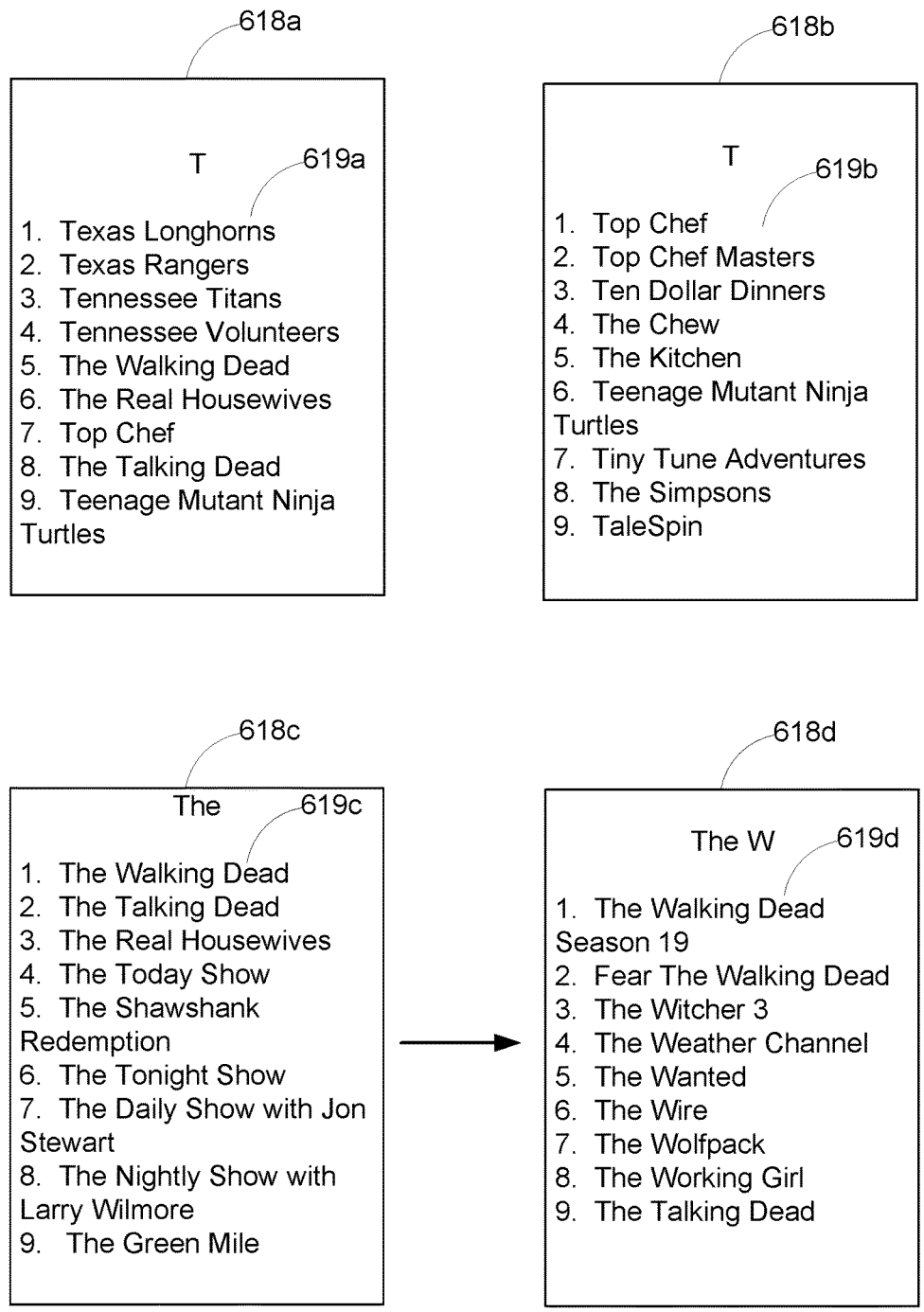
FIG. 6 illustrates four different search results interfaces, according to some embodiments.

FIG. 6 illustrates four different search results interfaces, according to some embodiments. As noted, a search result interface may include a visualization of the dynamic search process utilized in embodiments of the present technology. As a selection is made by the user, the results interface may display a list of results that may be relevant to the user's selection. The results in the results list and the order of the results in the results list may dynamically change over time based on the data input by a user and based on the data collected by the television receiver, which may control the results interface.

For example, search results interface 618a includes a results list 619a that includes nine itemized results based on an input of the letter "T" by a user. As noted, the results and their order may depend on a variety of different types of data, including data collected over time based on the user's interactions with the interface and television receiver, other user interactions that may feed information to the television receiver, publicly available data related to the environment that the user is in when making a selection, publicly available data related to the results themselves, such as movie and television show ratings, scheduling information received by the television receiver, user preferences, such as user preferences for certain shows, genres, etc., among other data. Search results interface 618a shows results list 619a, which includes "Texas Longhorns" and "Texas Rangers" as first and second results on the list, respectively. The user input of "T" that resulted in list 619a may be located, from, or otherwise associated with the state of Texas. In another example, the user may have watched Texas Longhorns and/or Texas Rangers games or other associated material using the television receiver in the past. Furthermore, result three is the Tennessee Titans and result four is the Tennessee Volunteers. Therefore, the user may generally be located in the southern part of the United States, may watch a lot of football games, or may just like sports. The remaining results may be relevant to the user based on the user's interactions, or they may be relevant to the user because those results are popular choices or have high ratings. However, results 1-4 are listed above results 5-9 because the system analyzed data collected, and determined that the user would be more interested in results 1-4 than results 5-9. For example, data considered may indicate that the user is located in Texas and watches a lot of sports, and that those factors were more highly rated than the factors that caused results 5-9 to be listed in the results list 619a. Results 1-4 may be listed higher because the determination that results 1-4 were relevant to the user (and their assigned ratings) were based on subjective criteria specific to the user instead of general criteria that may apply to any average person.

Similarly, search results interface 618b includes a results list 619b that includes nine itemized results based on an input of the letter "T" by a user. However, when this user selected an input of "T", different search results were included in the results list 619b as compared to results list 619a. Search results list 619b includes a variety of programming, such as television shows related to cooking and a variety of cartoon television shows. Therefore, this user may have shown an interest in cooking. For example, the user may have watched a lot of television shows related to cooking, may have indicated an interest in cooking manually by sending that information to the television receiver, or related data may have been collected in some other way. Furthermore, the data may have indicated that the user also watches cartoons on a regular basis (or over a certain predetermined threshold amount of time). However, the data may also indicate that the user watches cartoons only in the mornings and cooking related shows only in the evenings, and the cooking related shows should be rated higher than the cartoons because the user is performing the search (by selecting "T") in the evening.

As additional characters are selected when entering a search input, the results list may dynamically change based on the characters that are entered. For example, as shown in search results interface 618c, the entire word "The" has been selected. Because of this progress, results list 619c only includes search results that include the word "The". Similarly, results list 619d in results interface 618d include the top rated results for an input of "The W". As a user progresses further and enters more characters, the results list may dynamically adjust based on the inputs and based on additional data that has been collected over time. However, results may be included even if they do not match exactly with the characters that have been entered. For example, in results list 619d, result two includes "Fear The Walking Dead" and result nine includes "The Talking Dead". These results may be displayed because it is related to other results (e.g., The Walking Dead Season 19), and other users (or other collected data) may indicate that The Talking Dead is a popular television show to watch, either generally or along with The Walking Dead (which does, for example, fit the entry of "The W" by the user). Similar to other search results, Fear The Walking Dead may be listed in the rankings above The Talking Dead because of an analysis of the data collected regarding the user and other data.

Figure 7:
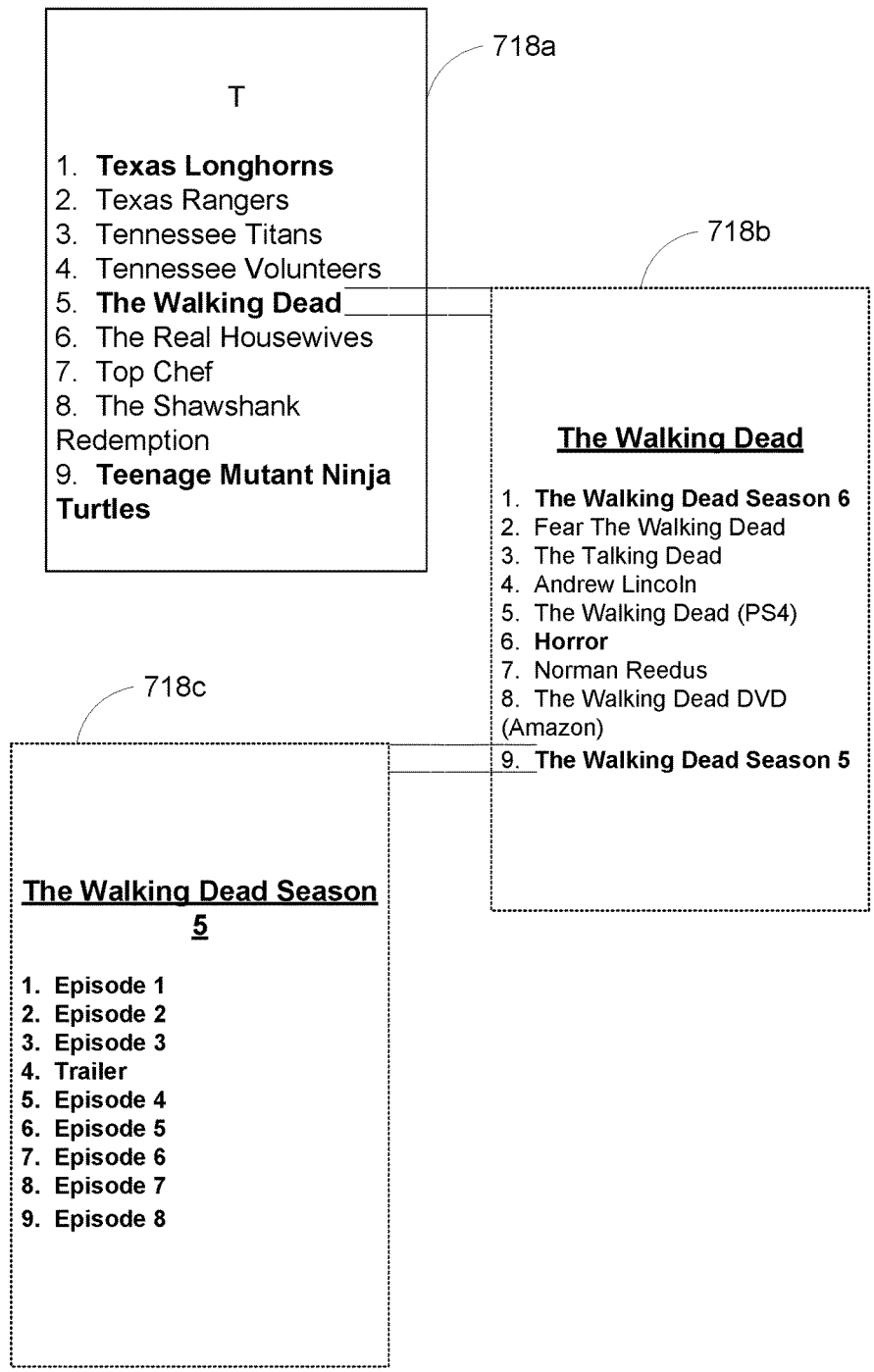
FIG. 7 illustrates multiple search results interfaces that show grouping of search results, according to some embodiments.

FIG. 7 illustrates multiple search results interfaces that show grouping of search results, according to some embodiments. As noted, a search result interface may include a visualization of the dynamic search process after a selection is made by the user, and the results interface may display a list of results that may be relevant to the user's selection. However, many results can be joined together into different groups or categories of results. As shown in FIG. 7, search results interface 718a includes a list with several results (bolded for reference) that could be groups or parts of a group. For example, The Walking Dead is a broad category of television shows, video games, DVDs, etc. and is related to a variety of actors/celebrities, novels, and other possible results. These results may have associations with each other. Therefore, even if a user is very interested in a particular television show, such as the Walking Dead, instead of listing all results related to that television show, the results list may only list one result as a group. The group may be displayed in the results list as a group until a certain predetermined time. For example, the group may be displayed in the results list as a group until the entire name of the group is spelled out or selected by a user. In another example, the group may be displayed in the results list as a group until a certain predetermined number of characters of the group name have been spelled out or selected by a user. In another example, the group may be displayed in the results list as a group until a user has ceased selecting characters in the search box. Other example methods for the are also possible.

As noted, different programming and other EPG listings, including television shows, video games, DVDs, actors (or other celebrities), novels, and other possible results may have associations with each other. These associations may be assigned such that they are predetermined and stored. In another embodiment, these associations may be assigned in real time. For example, if a new data point is received related to a new possible result (e.g., a new movie, new television show, new actor, etc.), then the new possible result may be assigned associations to other possible results based on its relationship with them. A result may be associated with another result based on a direct relationship or based on an indirect relationship through other results. For example, an actor may be associated with a movie or a television show if the actor was in that movie or television show. In another example, an actor may be associated with another actor if the two actors worked together on a movie or a television show. In another example, an actor may be associated with a movie if an actress that was in the movie has acted with the actor in the past (e.g., on a regular basis and have a strong association). These associations may contribute to the groups that are created and the rankings, ratings or weighting assigned to the groups.

Even though a group is listed in a results list, individual results from within a group may also be listed in the same results list. Similar to results in a results list, groups may be assigned rankings or ratings using a method similar to that for assigning the same to individual results. Therefore, an individual result may have a higher rating than a group, such as even a group that the individual result is a part of. However, if a group is rated higher than an individual result that may be included in that group, the system may reduce the rating of the individual result (either temporarily or permanently) so that the individual result is not included in the results list along with the group (e.g., to save space in the results list).

Groups may be curated or un-curated. Curated grouping may include groups that are manually created and stored at the television receiver for use during search and selection by a user. For example, groups may be created and received by the television receiver via a transponder stream, such as transponder stream 180-2 in FIG. 1. In other words, data with group information may be transmitted from a television service provider system, such as television service provider system 110 via satellites and transponder streams from the satellites. Curated groups may also be manually changed by a user, for example by removing or adding results from groups of results. For example, if a user does not enjoy a certain season of a television show, then the user may remove that season from a group representing the television show, which may include the different seasons of that television show. A user may also create new groups based on the user's tastes. Un-curated groups may be created using implicit grouping, or automatic grouping based on the letters or words entered by a user. Examples of un-curated groups include the result lists shown in FIG. 6. Un-curated groups may be created based on the real-time input by a user, and may take into account a variety of data collected by the television receiver over time and based on the environment at the time the group is being created.

When a user selects a group, new information may subsequently be listed in another results list that replaces or is displayed near the original results list that includes the group. For example, a second results list is illustrated as search results interface 718b. Search results interface 718b includes a variety of search results related to The Walking Dead, the user's selection. The individual results included in the list in interface 718b may not be included in the initial list (i.e. the list that is one level higher in the user list selection process) to save room in that list, and because the user can gain access to those results by selecting the group as a whole. Furthermore, as shown in FIG. 7, an additional search results interface 718c may replace or be displayed next to interface 718b and/or 718a after a user continues to select a group from within a list, such as result "The Walking Dead Season 5" of "The Walking Dead" group/list. Search results interface 718c includes more specific information related to the user's selection, The Walking Dead Season 5. For example, as shown in FIG. 7, results interface 718c includes a list of episodes from that group, among other results (e.g., a trailer—"Trailer"—for that season/group).

The television receiver may display an unlimited series of groups in a continued string of groups when groups are selected by a user, or may restrict/limit the number of groups that can be selected (e.g., by the user eventually reaching a "dead-end").

Figure 8:
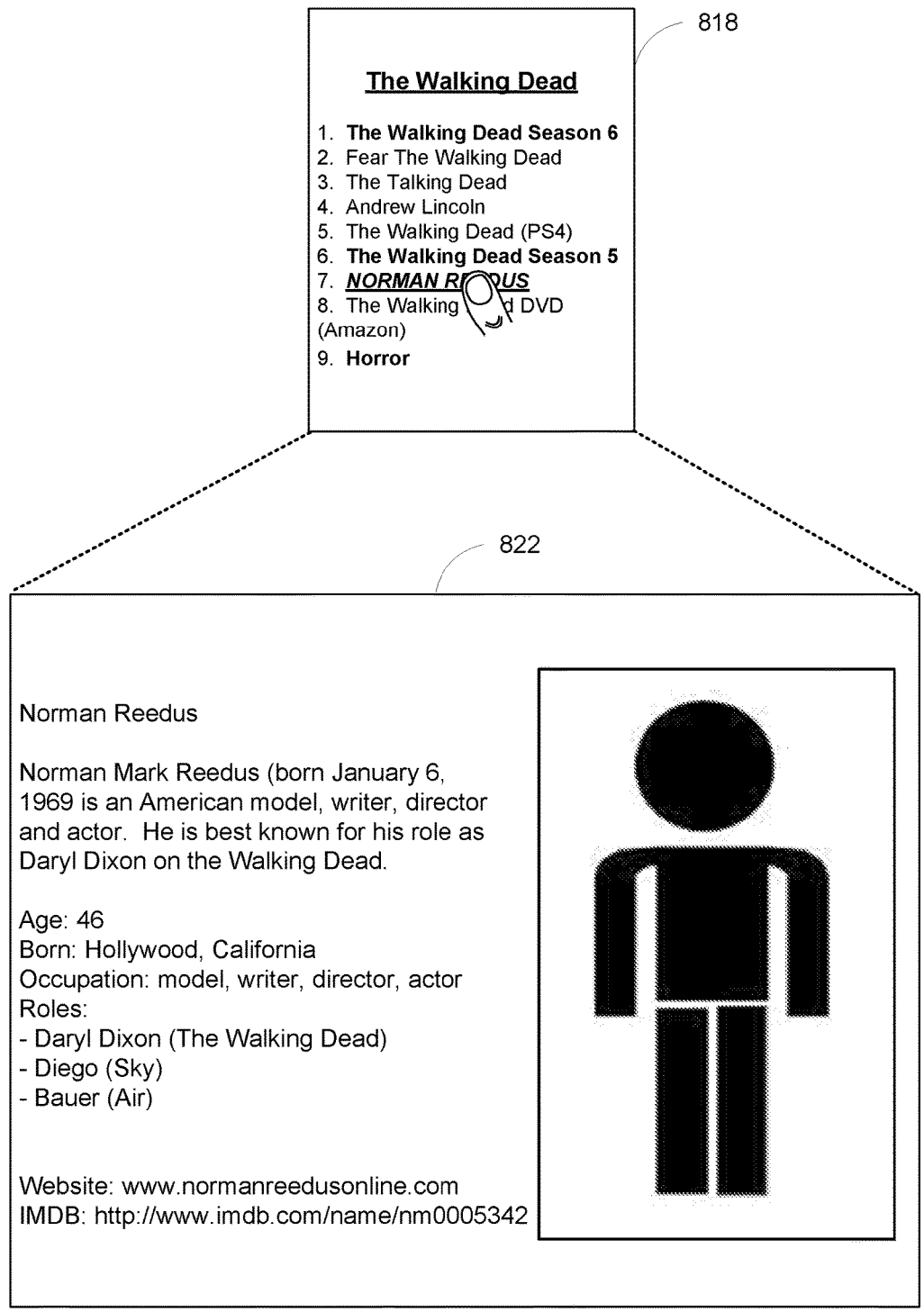
FIG. 8 illustrates a search results interface and an information interface, according to some embodiments.

FIG. 8 illustrates a search results interface and an information interface, according to some embodiments. As noted, many results can be joined together into different groups or categories of results. However, the selection of a group or an individual search result may result in the displaying of additional information related to the input or selection by a user. For example, as shown in FIG. 8, if a user selects a certain result, such as actor Norman Reedus from the list in search results interface 818, another interface, information interface 822, may display information related to that selection. For example, as shown in interface 822, information (such as information related to the user's selection or otherwise) may be displayed to inform the user of the information about the selection. The information may include associations or relationships that the input has.

Information displayed in an information interface, such as information interface 822, may also include a picture or multiple pictures, videos, or other media for viewing. Groups may also be associated with one or more media.

FIG. 9 illustrates an embodiment of a method 900 for dynamically generating a results list based on user, the user's input, and collected television receiver data, according to some embodiments. Method 900 includes step 902, which includes receiving, via one or more tuners, from the television service provider distribution network, a set of television data, wherein the television data is associated with programming of multiple television channels. Step 904 includes receiving a set of user data, wherein the user data includes data associated with a user of the television receiver. Step 906 includes receiving an input from the user, wherein the input indicates a preference for a search. Step 908 includes determining a list of input results based on the set of television data, the set of user data, and the input. Step 910 includes transmitting the list of television input results, wherein when the list of television input results is received, the list of television input results is displayable on the display device.

Figure 10:
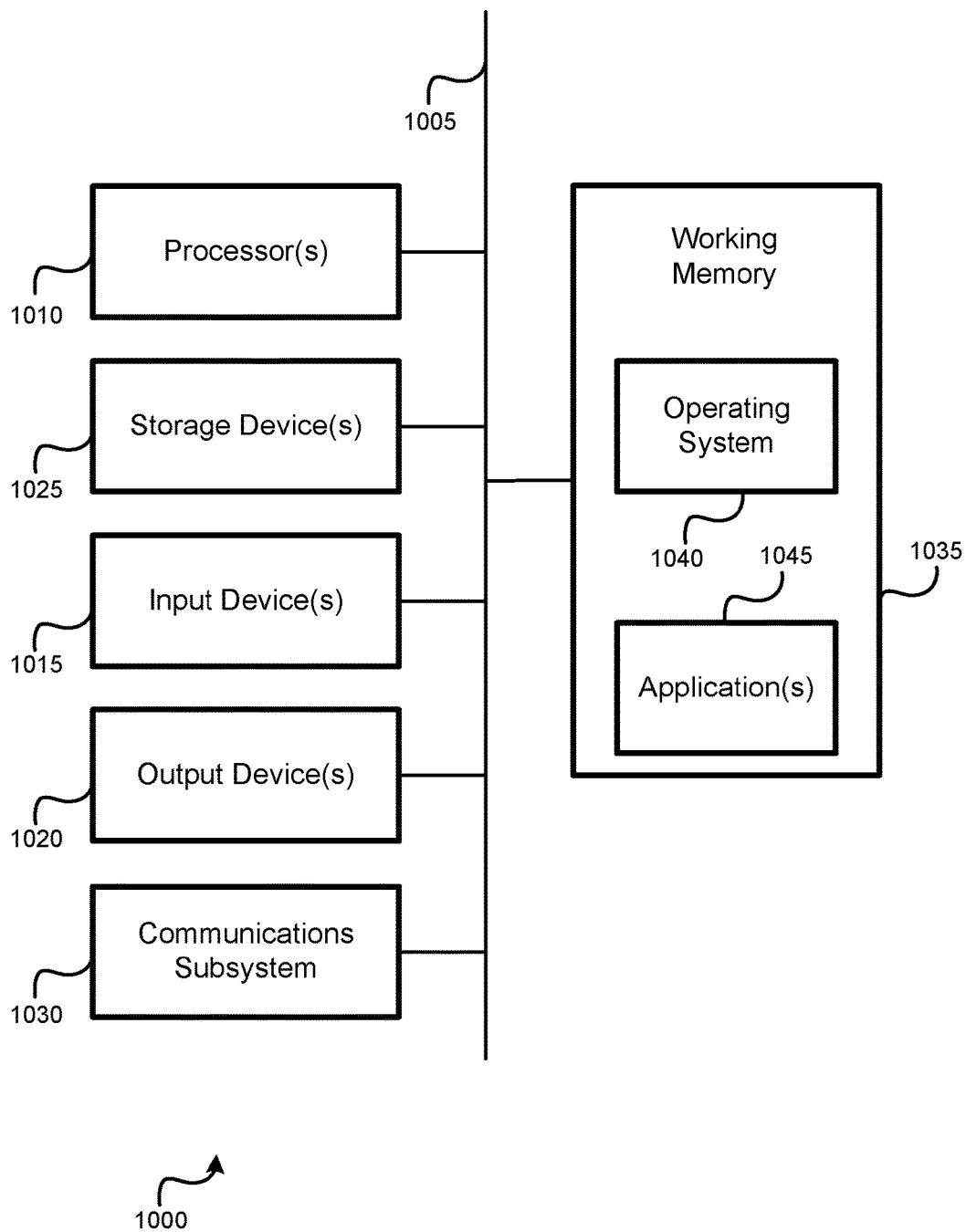
FIG. 10 illustrates an embodiment of a computer system.

A computer system as illustrated in FIG. 10 may be incorporated as part of the previously described computerized devices. For example, computer system 1000 can represent some of the components of the television receivers and/or television service provider systems. FIG. 10 provides a schematic illustration of one embodiment of a computer system 1000 that can perform the methods provided by various embodiments. It should be noted that FIG. 10 is meant only to provide a generalized illustration of various components, any or all of which may be utilized as appropriate. FIG. 10, therefore, broadly illustrates how individual system elements may be implemented in a relatively separated or relatively more integrated manner.

The computer system 1000 is shown comprising hardware elements that can be electrically coupled via a bus 1005 (or may otherwise be in communication, as appropriate). The hardware elements may include one or more processors 1010, including without limitation one or more general-purpose processors and/or one or more special-purpose processors (such as digital signal processing chips, graphics acceleration processors, and/or the like); one or more input devices 1015, which can include without limitation a mouse, a keyboard, and/or the like; and one or more output devices 1020, which can include without limitation a display device, a printer, and/or the like.

The computer system 1000 may further include (and/or be in communication with) one or more non-transitory storage devices 1025, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 1000 might also include a communications subsystem 1030, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities, etc.), and/or the like. The communications subsystem 1030 may permit data to be exchanged with a network (such as the network described below, to name one example), other computer systems, and/or any other devices described herein. In many embodiments, the computer system 1000 will further comprise a working memory 1035, which can include a RAM or ROM device, as described above.

The computer system 1000 also can comprise software elements, shown as being currently located within the working memory 1035, including an operating system 1040, device drivers, executable libraries, and/or other code, such as one or more application programs 1045, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 1025 described above. In some cases, the storage medium might be incorporated within a computer system, such as computer system 1000. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 1000 and/or might take the form of source and/or installable code, which, upon compilation and/or installation on the computer system 1000 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 1000) to perform methods in accordance with various embodiments of the invention. According to a set of embodiments, some or all of the procedures of such methods are performed by the computer system 1000 in response to processor 1010 executing one or more sequences of one or more instructions (which might be incorporated into the operating system 1040 and/or other code, such as an application program 1045) contained in the working memory 1035. Such instructions may be read into the working memory 1035 from another computer-readable medium, such as one or more of the non-transitory storage device(s) 1025. Merely by way of example, execution of the sequences of instructions contained in the working memory 1035 might cause the processor(s) 1010 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1000, various computer-readable media might be involved in providing instructions/code to processor(s) 1010 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 1025. Volatile media include, without limitation, dynamic memory, such as the working memory 1035.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1010 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1000.

The communications subsystem 1030 (and/or components thereof) generally will receive signals, and the bus 1005 then might carry the signals (and/or the data, instructions, etc. carried by the signals) to the working memory 1035, from which the processor(s) 1010 retrieves and executes the instructions. The instructions received by the working memory 1035 may optionally be stored on a non-transitory storage device 1025 either before or after execution by the processor(s) 1010.

It should further be understood that the components of computer system 1000 can be distributed across a network. For example, some processing may be performed in one location using a first processor while other processing may be performed by another processor remote from the first processor. Other components of computer system 1000 may be similarly distributed.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bind the scope of the claims.

What is claimed is:

1. A television receiver for generating input results, the television receiver comprising:
    one or more tuners configured to receive television programming via a television service provider distribution network;
    a television interface configured to output the television programming to a display device;
    one or more processors; and
    a memory communicatively coupled with and readable by the one or more processors and having stored therein processor-readable instructions which, when executed by the one or more processors, cause the one or more processors to:
        receive, via the one or more tuners, from the television service provider distribution network, a set of television data, wherein the set of television data is associated with programming of multiple television channels;
        receive a set of user data, wherein:
            the set of user data is indicative of user preferences determined over a period of time based on user interactions with the television receiver, the user preferences being at least partially based on: a genre of television programming being output by the television receiver for viewing at least a threshold amount of time;
        receive an input from a user, wherein the input is a string of characters representing a partial search string;
        in response to receiving the input from the user, determine a list of input results based on the set of television data, the set of user data, and the partial search string, wherein:
            determining the list of inputs is performed in response to input of a character of the string of characters, wherein each input of the list of inputs is intended to accurately represent an intent of the input from the user; and
            the list of input results comprises a group input result, the group input result being a single result that is representative of a television series that is associated with multiple episodes;
        transmit the list of input results to the television interface for display;
        receive additional input from the user comprising additional characters added to the string of characters representing the partial search string;
        determine that a predefined number of characters has been reached in length by the partial search string having the additional characters that partially spells out the group input result; and
        in response to determining that the predefined number of characters of the group input result has been spelled out by the partial search string having the additional characters, transmit an indication of the multiple episodes corresponding to the group to the television interface for display.

2. The television receiver of claim 1, wherein the set of television data includes predetermined television programming information related to the multiple television channels.

3. The television receiver of claim 1, wherein the set of television data includes data related to an environment of the television receiver.

4. The television receiver of claim 1, wherein the list of input results includes a ranking of results, wherein the ranking of the results is determined based on the set of television data, the set of user data, and the input.

5. A computer-implemented method, the method comprising:
    receiving, via one or more tuners, from a television service provider distribution network, a set of television data, wherein the set of television data is associated with programming of multiple television channels;
receiving a set of user data, wherein:
the set of user data is indicative of user preferences determined over a period of time based on user interactions with a television receiver;
receiving an input from a user, wherein the input is a string of characters representing a partial search string;
in response to receiving the input from the user, determining a list of input results based on the set of television data, the set of user data, and the partial search string, wherein:
determining the list of inputs is performed in response to input of a character of the string of characters, wherein each input of the list of inputs is intended to accurately represent an intent of the input from a user; and
the list of input results comprises a group input result, the group input result being a single result that is representative of a television series that is associated with multiple episodes;
transmitting the list of input results to a display device;
receiving additional input from the user comprising additional characters added to the string of characters representing the partial search string;
determining that a predefined number of characters has been reached in length by the partial search string having the additional characters that partially spells out the group input result; and
in response to determining that the predefined number of characters of the group input result has been spelled out by the partial search string having the additional characters, transmitting an indication of the multiple episodes corresponding to the group to the display device.

6. The method of claim 5, wherein the set of television data includes predetermined television programming information related to the multiple television channels.

7. The method of claim 5, wherein the set of television data includes data related to an environment of the television receiver.

8. The method of claim 5, wherein the list of input results includes a ranking of results, wherein the ranking of the results is determined based on the set of television data, the set of user data, and the input.

9. A non-transitory machine-readable storage medium comprising processor-readable instructions configured to cause one or more processors to:
receive, via one or more tuners, from a television service provider distribution network, a set of television data, wherein the set of television data is associated with programming of multiple television channels;
receive a set of user data, wherein:
the set of user data is indicative of user preferences determined over a period of time based on user interactions;
receive an input from a user, wherein the input is a string of characters representing a partial search string;
in response to receiving the input from the user, determine a list of input results based on the set of television data, the set of user data, and the partial search string, wherein:
determining the list of inputs is performed in response to input of a character of the string of characters, wherein each input of the list of inputs is intended to accurately represent an intent of the input from a user; and
the list of input results comprises a group input result, the group input result being a single result that is representative of a television series that has multiple episodes;
transmit the list of input results to a display device;
receive additional input from the user comprising additional characters added to the string of characters representing the partial search string;
determine that a predefined number of characters has been reached in length by the partial search string having the additional characters that partially spells out the group input; and
in response to determining that the predefined number of characters of the group input result has been spelled out by the partial search string having the additional characters, transmit an indication of the multiple episodes corresponding to the group to the display device.

10. The non-transitory machine-readable storage medium of claim 9, wherein the set of television data includes predetermined television programming information related to the multiple television channels.

11. The non-transitory machine-readable storage medium of claim 9, wherein the set of television data includes data related to an environment of a television receiver that comprises the non-transitory machine-readable storage medium.

12. The non-transitory machine-readable storage medium of claim 9, wherein the list of input results includes a ranking of results, wherein the ranking of the results is determined based on the set of television data, the set of user data, and the input.

* * * * *